United States Patent
Choudhury et al.

(10) Patent No.: US 7,369,571 B2
(45) Date of Patent: May 6, 2008

(54) METHOD AND SYSTEM FOR SENDING E-LSP PACKETS HAVING QOS ACROSS A CELL ATM BASED NETWORK

(75) Inventors: Sanjaya Choudhury, Allison Park, PA (US); Rahmi Marasli, Mars, PA (US)

(73) Assignee: Ericsson AB, Stockholm (SE)

( * ) Notice: Subject to any disclaimer, the term of this patent is extended or adjusted under 35 U.S.C. 154(b) by 771 days.

(21) Appl. No.: 10/836,055

(22) Filed: Apr. 30, 2004

(65) Prior Publication Data

US 2005/0243833 A1    Nov. 3, 2005

(51) Int. Cl.
    *H04J 3/16* (2006.01)
(52) U.S. Cl. .................. 370/466; 370/395.21; 370/400
(58) Field of Classification Search ............ 370/395.1, 370/396, 397, 399, 466
    See application file for complete search history.

(56) References Cited

U.S. PATENT DOCUMENTS

| | | | |
|---|---|---|---|
| 5,307,340 A * | 4/1994 | Inoue et al. ................ | 370/245 |
| 6,424,629 B1 * | 7/2002 | Rubino et al. ........... | 370/241.1 |
| 6,636,484 B1 * | 10/2003 | Agrawal et al. ............ | 370/248 |
| 6,725,401 B1 * | 4/2004 | Lindhorst-Ko ............... | 714/47 |
| 7,023,856 B1 * | 4/2006 | Washabaugh et al. ... | 370/395.1 |
| 7,092,361 B2 * | 8/2006 | Puppa et al. ................ | 370/242 |
| 2003/0039246 A1 * | 2/2003 | Guo et al. ................... | 370/389 |
| 2003/0099245 A1 * | 5/2003 | Kim et al. ............. | 370/395.52 |
| 2003/0118026 A1 * | 6/2003 | Kuhl et al. ............ | 370/395.21 |
| 2004/0105391 A1 * | 6/2004 | Charcranoon ................ | 370/252 |
| 2004/0165597 A1 * | 8/2004 | Bicknell et al. ........ | 370/395.31 |
| 2005/0157729 A1 * | 7/2005 | Rabie et al. ........... | 370/395.53 |
| 2005/0195767 A1 * | 9/2005 | Rahman ..................... | 370/331 |
| 2006/0203717 A1 * | 9/2006 | Puppa et al. ................ | 370/216 |

* cited by examiner

*Primary Examiner*—Edan Orgad
*Assistant Examiner*—Mounir Moutaouakil
(74) *Attorney, Agent, or Firm*—Ansel M. Schwartz

(57) ABSTRACT

A telecommunications system includes a packet based network. The system includes a packet ingress node for packets having a QOS in communication with the packet based network. The system includes an ATM ingress node for an ATM network. The ATM ingress node receiving the packets from the packet ingress node through the packet based network, segmenting the packets into cells and identifying the QOS associated with each cell. The system includes an ATM network in communication with the ATM ingress node. The system includes an ATM egress node which receives cells from the ATM ingress nodes. The ATM egress node in communication with the ATM network. The ATM egress node reassembles the cells back into the packets. The ATM egress node in communication with the packet based network. The system includes a plurality of VCs corresponding with QOS between the ATM ingress node and the ATM egress node through the ATM network. The ATM ingress node sending each cell to the ATM egress node along the VCs whose QOS corresponds to the QOS of each cell. The system includes a packet egress node for the packets in communication with the ATM egress node through the packet based network, which receives the packets from the ATM egress node. A method for sending packets.

6 Claims, 1 Drawing Sheet

METHOD AND SYSTEM FOR SENDING E-LSP PACKETS HAVING QOS ACROSS A CELL ATM BASED NETWORK

FIELD OF THE INVENTION

The present invention is related to sending packets having QoS from a packet based network across a cell based network while maintaining the QoS for cells of the corresponding packets. More specifically, the present invention is related to sending E-LSP packets having QoS from a packet based MPLS network across a cell based ATM network while maintaining the QoS for cells of the corresponding packets using a plurality of VCs for the cells corresponding to the QoS classes requested by the packets.

BACKGROUND OF THE INVENTION

More and more network service providers are using MPLS in their next generation networks. MPLS is seen as a convergence technology where IP, Frame Relay, ATM can be carried over a single network thereby resulting in savings in operating expenses. Service providers are also using MPLS for providing new services such as L3 VPNs [E. Rosen, Y. Rekhter, "BGP/MPLS VPNs", Internet Draft, draft-ietf-l3vpn-rfc2547bis-01.txt, September 2003, incorporated by reference herein].

One of the main strengths of MPLS as opposed to plain IP is its rich Traffic Management/Traffic Engineering (TM/TE) features [RFC3031: Multiprotocol Label Switching Architecture, IETF Standards Track RFC, January 2001; RFC2702: Requirements for Traffic Engineering over MPLS, IETF Standards Track RFC, September 1999, both of which are incorporated by reference herein]. One of the important MPLS TM features is MPLS DiffServ [RFC3270: MPLS Support of Diff-Serv, IETF Standards Track RFC, May 2002; RFC3564: Requirements for Support of Differentiated Services-aware MPLS Traffic Engineering, IETF Informational RFC, July 2003, both of which are incorporated by reference herein]. Via MPLS, it is possible to set up a tunnel (Label Switched Path—LSP) between two hops that does not follow the traditional IP next-hop routing. MPLS DiffServ allows you to reserve bandwidth for LSPS, to define per-hob-behavior (PHB) treatment for packets using this LSP, etc. [RFC3270: MPLS Support of Diff-Serv, IETF Standards Track RFC, May 2002; RFC2475: An Architecture for Differentiated Services, IETF Informational RFC, December 1998; RFC3260: New Terminology and Clarifications for Diffserv, IETF Informational RFC, April 2002, all of which are incorporated by reference herein.]

There are two types of LSPs in MPLS DiffServ: L-LSP and E-LSP. In the case of L-LSP, the PHB treatment of a packet is inferred from the label value whereas in E-LSP, the treatment is derived from the EXP encoding within the shim header. E-LSPs allows up to 8 different PHBs per LSP (since EXP is a 3-bit wide field [RFC3021: MPLS Label Stack Encoding, IETF Standards Track RFC, January 2001, incorporated by reference herein]). In general, E-LSPs are more widely deployed than L-LSPs.

Various works has been done in the past to support MPLS over ATM. RFC3035 [RFC3035: MPLS using LDP and ATM VC Switching, IETF Standards Track RFC, January 2001, incorporated by reference herein] introduces the concept of Label-Controlled ATM (LC-ATM) where the top label of an LSP is encoded within the Virtual Path/Virtual Circuit Identifier (VPI/VCI) of the ATM cell header. These VPI/VCI values are exchanged by MPLS Label Distribution Protocols like RSVP-TE and LDP [RFC3035: MPLS using LDP and ATM VC Switching, IETF Standards Track RFC, January 2001; RFC3209: Extensions to RSVP for LSP Tunnels, IETF Standards Track RFC, December 2001; RFC3036: LDP Specification, IETF Standards Track RFC, January 2001, all of which are incorporated by reference herein]. RFC3038 [RFC3038: VCID Notification over ATM link for LDP, IETF Standards Track RFC, January 2001, incorporated by reference herein] proposes a technique to associate a unique end-to-end identifier (VCID) with ATM Virtual Circuits (VCs), which can be used to bind MPLS "streams" to existing ATM VCs. In addition to these, Ships-In-Night (SIN) proposes to have both ATM and MPLS control planes working side by side on the same switch without any interaction between them. The work is also underway to have a full MPLS/ATM control plane interworking (e.g., see ATM-MPLS Network Interworking Signaling Specification 1.0, ATM Forum Standard, August 2003, incorporated by reference herein).

In all these approaches, supporting L-LSPs over ATM is straightforward. You usually have one L-LSP mapped into an ATM VC with an appropriate queuing/scheduling treatment to match L-LSPs PHB. RFC3270 [RFC3270: MPLS Support of Diff-Serv, IETF Standards Track RFC, May 2002, incorporated by reference herein] presents protocol extensions to support this.

There is, however, no easy way of supporting E-LSPs over LC-ATM interfaces and is considered unsupported by RFC3270 [RFC3270: MPLS Support of Diff-Serv, IETF Standards Track RFC, May 2002, incorporated by reference herein]. Since EXP bits are stored within the packet that is segmented into cells at the ingress ATM node of the network, transit ATM switches have no idea which PHB to apply to for an incoming cell. To further complicate this situation, most of the existing legacy ATM switches give only one queuing/scheduling treatment to cells belonging to a single VC.

To overcome this problem, the present invention provides a novel solution where E-LSPs can be supported over legacy ATM switches. This solution does not require any new hardware features and can be achieved just by a software upgrade. Only basic ATM functionality support at the hardware such as switching based on standard ATM header and support for standard ATM service classes [ATM Forum Standards.Available: http://www.atmforum.com/standards/approved.html; D. E. McDysan, D. L. Spohn, ATM: Theory and Applications, McGraw-Hill Series on Computer Communications, both of which are incorporated by reference herein] is assumed. This is a cost effective way of supporting E-LSPs over existing legacy ATM networks without any new investment in hardware for network service providers.

The problems in supporting E-LSPs over ATM can be summarized as follows:

1. How to determine PHB treatment of cells in a VC, given that the corresponding EXP encoding is not known, and
2. How to give different PHB treatments (i.e., scheduling, queuing) to cells belonging to same VC.

To address the first problem, one can think of somehow encoding EXP bits to ATM header. Possible solutions for this approach could be (refer to ATM Forum Standards. Available: http://www.atmforum.com/standards/approved.html; D. E. McDysan, D. L. Spohn, ATM: Theory and Applications, McGraw-Hill Series on Computer Communications, both of which are incorporated by reference herein, for ATM header description and definitions of CLP, PTI, GFC, UNI/NNI, and other ATM related terms):

Using certain PTI values along with CLP bit to carry EXP encoding information, or Using top two bits of GFC (in UNI interface)/VPI (at NNI interface) along with CLP bit to encode EXP bits, or Some other cell-header based encoding technique.

In all these methods, one will be changing the meaning of ATM cell header and restricting the underlying ATM functionality (e.g., certain PTI or GFC/VPI values cannot be used). They all also imply that one will need new ATM switching hardware to support new header formats.

As another alternative solution, one can think of having a SAR (segmentation/reassembly) at each node. Once the cells are reassembled, EXP bits can be recovered from the underlying packet. There could be some ATM switches capable of doing this. However, a vast majority of the existing hardware platforms will not support SAR at every node. Such a method will also increase the jitter/delay unnecessarily within the ATM network.

None of these possible solutions address the second problem. For it, one will need specialized ATM hardware where queuing/scheduling decisions are made at cell level (not at VC level). (This problem can be resolved if SAR is done at every node and the scheduling/queuing is done at packet level, not at cell level. However, this solution still needs specialized hardware and SAR is not typical on ATM switches as mentioned before.) Additionally, this ATM scheduling/queuing hardware should be sophisticated enough to ensure cells from different packets within the same VC are not interleaved (i.e., scheduling of traffic within VCs should be done at individual packet boundaries). (Please notice that this will increase delay/jitter since all of the cells belonging to a packet will be transmitted all at once, in a bursty fashion. Additionally, incoming traffic will be buffered at least until the last cell of a packet is received even when there is no congestion in the network.) There are few existing ATM switches that can provide this level of sophistication.

SUMMARY OF THE INVENTION

The present invention pertains to a telecommunications system. The system comprises a packet based network. The system comprises a packet ingress node for packets having a QOS in communication with the packet based network. The system comprises an ATM ingress node for an ATM network. The ATM ingress node receiving the packets from the packet ingress node through the packet based network, segmenting the packets into cells and identifying the QOS associated with each cell. The system comprises an ATM network in communication with the ATM ingress node. The system comprises an ATM egress node which receives cells from the ATM ingress nodes. The ATM egress node in communication with the ATM network. The ATM egress node reassembles the cells back into the packets. The ATM egress node in communication with the packet based network. The system comprises a plurality of VCs corresponding with QOS between the ATM ingress node and the ATM egress node through the ATM network. The ATM ingress node sending each cell to the ATM egress node along the VCs whose QOS corresponds to the QOS of each cell. The system comprises a packet egress node for the packets in communication with the ATM egress node through the packet based network, which receives the packets from the ATM egress node. Preferably, the system comprises an E-LSP connection for carrying traffic from an ingress packet node to an egress packet node traversing an ATM network (having an ingress and egress node itself) between the ingress and egress packet nodes.

The present invention pertains to a method for sending packets. The method comprises the steps of receiving packets at an ATM ingress node from a packet ingress node through a packet based network. There is the step of segmenting the packets into cells and identifying a QOS associated with each cell at the ATM ingress node. There is the step of receiving the cells from the ATM ingress node at an ATM egress node through a plurality of VCs whose QOS corresponds with the QOS of the cells between the ATM ingress node and the ATM egress node of an ATM network. There is the step of reassembling the cells back into the packets at an ATM egress node. There is the step of receiving the packets from the ATM egress node at a packet egress node for the packets through the packet based network.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
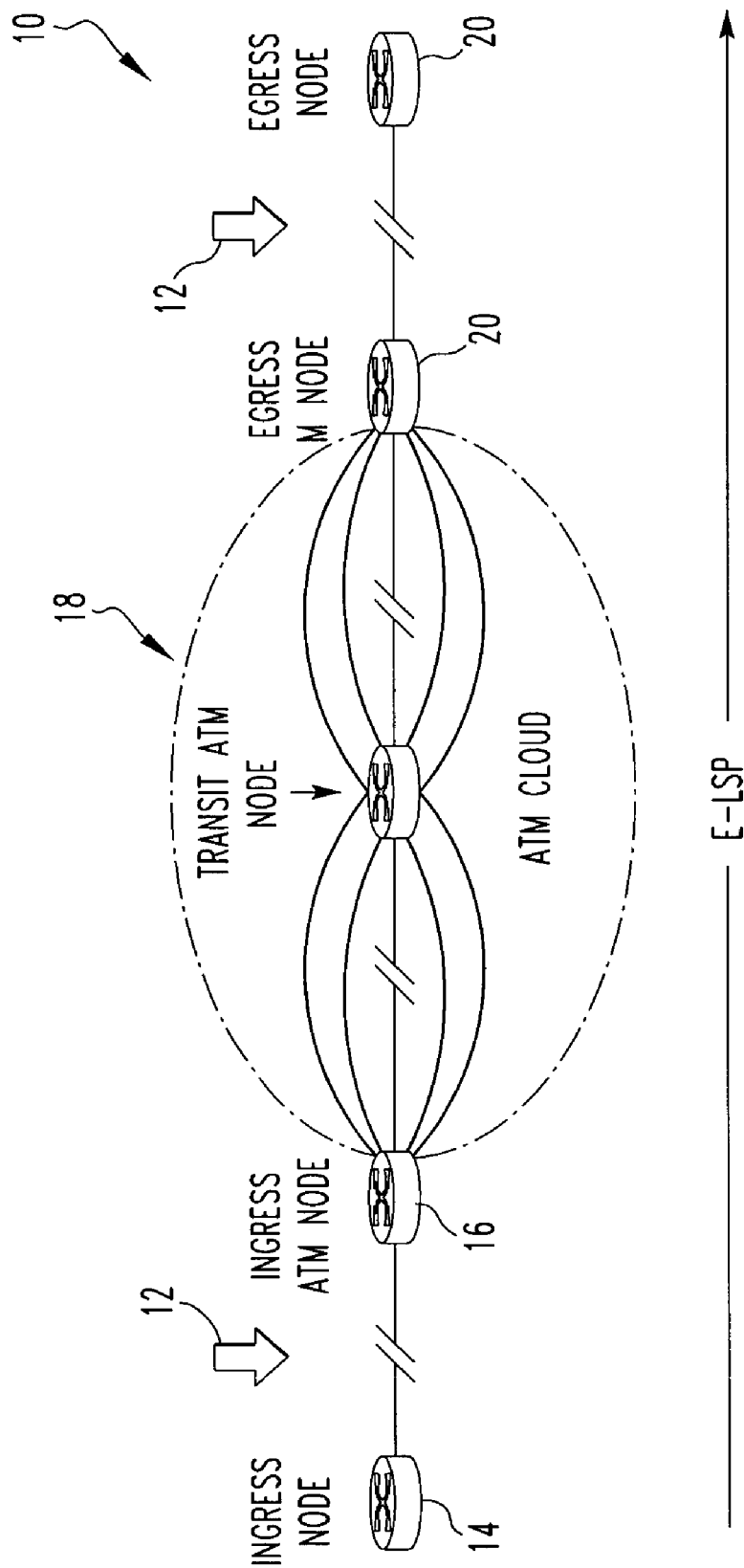
FIG. 1 is a schematic representation of a network of the present invention.

Referring now to the drawings wherein like reference numerals refer to similar or identical parts throughout the several views, and more specifically to FIG. 1 thereof, there is shown a telecommunications system 10. The system 10 comprises a packet based network 12. The system 10 comprises a packet ingress node 14 for packets having a QOS in communication with the packet based network 12. The system 10 comprises an ATM ingress node 16 for an ATM network 18. The ATM ingress node 16 receiving the packets from the packet ingress node 14 through the packet based network 12, segmenting the packets into cells and identifying the QOS associated with each cell. The system 10 comprises an ATM network 18 in communication with the ATM ingress node 16. The system 10 comprises an ATM egress node 20 which receives cells from the ATM ingress nodes 16. The ATM egress node 20 in communication with the ATM network 18. The ATM egress node 20 reassembles the cells back into the packets. The ATM egress node 20 in communication with the packet based network 12. The system 10 comprises a plurality of VCs 22 corresponding with QOS between the ATM ingress node 16 and the ATM egress node 20 through the ATM network 18. The ATM ingress node 16 sending each cell to the ATM egress node 20 along the VCs 22 whose QOS corresponds to the QOS of each cell. The system 10 comprises a packet egress node 24 for the packets in communication with the ATM egress node 20 through the packet based network 12, which receives the packets from the ATM egress node 20.

Preferably, the packet based network 12 is an MPLS network. The packets are preferably E-LSP packets. Preferably, the QOS of each packet has an EXP value. There is preferably one VC for each per hop scheduling class supported by the MPLS network. Preferably, each cell has a PHB which is determined from VPI/VCI values. PSC to VC mappings for corresponding EXP values is preferably signaled to the nodes via RSVP-TE or LDP. As an alternative, these mappings can be manually configured via a management station.

The present invention pertains to a method for sending packets. The method comprises the steps of receiving packets at an ATM ingress node 16 from a packet ingress node 14 through a packet based network 12. There is the step of segmenting the packets into cells and identifying a QOS associated with each cell at the ATM ingress node 16. There is the step of receiving the cells from the ATM ingress node 16 at an ATM egress node 20 through a plurality of VCs 22 whose QOS corresponds with the QOS of the cells between the ATM ingress node 16 and the ATM egress node 20 of an ATM network 18. There is the step of reassembling the cells back into the packets at an ATM egress node 20. There is the step of receiving the packets from the ATM egress node 20 at a packet egress node 24 for the packets through the packet based network 12.

In the operation of the invention, multiple VCs 22 for E-LSPs: one for each Per Hop Scheduling Class (PSC) are used. Here, PHB of a cell is determined from VPI/VCI values along with the corresponding CLP (for color information). PSC to VC mappings for the corresponding EXP encoding can be signaled via RSVP-TE or LDP. As an alternative, these mappings can be manually configured via a management station. Hence, all of the switches from ingress ATM node to egress one will be informed about this and the corresponding VCs 22 are provisioned to match the PHB treatment.

A brief representation of the reference model is given in FIG. 1. At the ingress ATM edge, the incoming E-LSP traffic will be classified based on their PSC values and forwarded to corresponding VCs 22. CLP values of the cells will be derived from the EXP PHB mappings.

The transit ATM nodes will just do regular ATM switching and scheduling/queuing. There is no change in their behaviors.

At the egress ATM node, incoming cells from all these VCs 22 will be reassembled and forwarded to a single E-LSP. EXP bits of outgoing packets will be derived from incoming cells' VPI/VCI values along with the corresponding CLP bits.

At the ATM nodes, PSCs associated with an E-LSP will be mapped to the native ATM Quality-of-Service (QoS) classes. One way of doing this is described at [Tip Sheet: Support for IP Differentiated Services and IEEE 802.1D over ATM, ATM Forum Draft, BTD-TM-TS-DIFF-01.01, October 2000, incorporated by reference herein]. As an alternative (or a complementary technique), user specified, customized local configurations can also be used.

DiffServ PHBs have three different color definitions: red, yellow and green. In contrast, ATM CLP bit can only represent two values: marked (i.e., red/yellow) or unmarked (green). For color-to-CLP mappings, the proposed mappings at [RFC3270: MPLS Support of Diff-Serv, IETF Standards Track RFC, May 2002, incorporated by reference herein] will be used. At the egress ATM node, if any one of the cells of a packet is marked (i.e., CLP=1), then the corresponding packet's color will be set as red. Otherwise, it will be set to green.

This solution addresses the first problem in a straightforward manner: inferring PHBs of incoming cells without any changes to ATM cell header encoding. The second problem (i.e., inferring scheduling/queuing of cells based on EXP encoding) is also resolved in a way that does not require any modifications to traditional ATM switches.

Hence, the proposed solution does not put any extra burden on ATM switches, particularly at transit nodes. As always, ingress and egress ATM switches should be operating in hybrid mode (e.g., they should understand both ATM and IP/MPLS). However, this new solution does not complicate their existing IP/MPLS or ATM operations.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A telecommunications system comprising:
   an MPLS (multi-protocol label switching) packet based network;
   a packet ingress node for E-LSP (EXP inferred per hop behavior label switched path) packets having a QOS (quality of service) in communication with the packet based network;
   an ATM (asynchronous transfer mode) ingress node for an ATM network, the ATM ingress node receiving each E-LSP packet from the packet ingress node through the packet based network, segmenting the packet into cells including inferring PHBs (per-hop-behavior) of the cells without any changes to the cells' header encoding and inferring scheduling/queuing of cells based on the E-LSP packet's EXP (experimental) encoding, classifying the E-LSP packet based on its PSC (per-hop scheduling class) value, identifying the QOS associated with each cell, mapping the cells into the associated QOS, and forwarding the cells to a corresponding VC (virtual circuit);
   an ATM network in communication with the ATM ingress node;
   an ATM egress node which receives cells from the ATM ingress node, the ATM egress node in communication with the ATM network, the ATM egress node reassembles the cells from each VC back into a single E-LSP packet, and derives EXP bits for the single E-LSP packet from the received cells' VPI/VCI (virtual path/virtual circuit identifier) values and the cells' corresponding CLP (cell loss priority) bits, the ATM egress node in communication with the packet based network;
   a plurality of VCs corresponding with QOS between the ATM ingress node and the ATM egress node through the ATM network, the ATM ingress node sending each cell to the ATM egress node along the VCs whose QOS corresponds to the QOS of each cell; and
   a packet egress node for the packets in communication with the ATM egress node through the packet based network, which receives the packets from the ATM egress node.

2. A system as described in claim 1 wherein the QOS of each packet has an EXP value.

3. A system as described in claim 2 wherein there is one VC for each per hop scheduling class supported by the MPLS network.

4. A system as described in claim 3 wherein each cell has a PHB which is determined from VPI/VCI values.

5. A system as described in claim 4 wherein PSC to VC mappings for corresponding EXP values is signaled to the nodes via RSVP-TE (resource reservation protocol-traffic engineering) or LDP (label distribution protocol) or manually configured via a management system.

6. A method for sending packets comprising the steps of:
   receiving an E-LSP (EXP inferred per hop behavior label switched path) packet having a QOS (quality of service) at an ATM ingress node from a packet ingress node through an MPLS (multi-protocol label switching) packet based network;

segmenting the packet into cells and identifying a QOS associated with each cell at the ATM ingress node including inferring PHBs (per-hop-behavior) of the cells without any changes to the cells' header encoding and inferring scheduling/queuing of cells based on the E-LSP packet's EXP (experimental) encoding, and forwarding the cells to a corresponding VC (virtual circuit);

classifying the E-LSP packet based on its PSC (per-hop scheduling class) value, identifying the QOS associated with each cell, mapping the cells into the associated QOS;

receiving the cells from the ATM (asynchronous transfer mode) ingress node at an ATM egress node through a plurality of VCs whose QOS corresponds with the QOS of the cells between the ATM ingress node and the ATM egress node of an ATM network;

reassembling the cells from each VC back into a single E-LSP packet at an ATM egress node and deriving EXP bits for the single E-LSP packet from the received cells' VPI/VCI (virtual path/virtual circuit identifier) values and the cells' corresponding CLP (cell loss priority) bits; and receiving the packets from the ATM egress node at a packet egress node for the packets through the packet based network.

* * * * *